(12) United States Patent
Satyan et al.

(10) Patent No.: US 9,465,110 B2
(45) Date of Patent: Oct. 11, 2016

(54) THREE-DIMENSIONAL TOMOGRAPHIC IMAGING CAMERA BASED ON COMPRESSIVE SENSING

(71) Applicants: Naresh Satyan, Pasadena, CA (US); Arseny Vasilyev, Pasadena, CA (US); Amnon Yariv, Pasadena, CA (US); George Rakuljic, Santa Monica, CA (US)

(72) Inventors: Naresh Satyan, Pasadena, CA (US); Arseny Vasilyev, Pasadena, CA (US); Amnon Yariv, Pasadena, CA (US); George Rakuljic, Santa Monica, CA (US)

(73) Assignees: TELARIS INC., Santa Monica, CA (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 563 days.

(21) Appl. No.: 14/050,296

(22) Filed: Oct. 9, 2013

(65) Prior Publication Data

US 2014/0104593 A1     Apr. 17, 2014

Related U.S. Application Data

(60) Provisional application No. 61/711,417, filed on Oct. 9, 2012.

(51) Int. Cl.
| | |
|---|---|
| G01S 17/08 | (2006.01) |
| G01S 17/32 | (2006.01) |
| G01S 7/491 | (2006.01) |
| G01S 17/89 | (2006.01) |

(52) U.S. Cl.
CPC ............. *G01S 17/08* (2013.01); *G01S 7/4911* (2013.01); *G01S 7/4913* (2013.01); *G01S 17/325* (2013.01); *G01S 17/89* (2013.01)

(58) Field of Classification Search
CPC ....... G01C 15/02; G01C 15/00; G01S 17/32; G01S 17/89
USPC .................................. 356/3.01–5.15
See application file for complete search history.

(56) References Cited

U.S. PATENT DOCUMENTS

| | | | |
|---|---|---|---|
| 7,764,384 B1 * | 7/2010 | Zhao ................... | G01B 9/02004 356/486 |
| 8,642,982 B2 * | 2/2014 | Plusquellic ............. | G01J 3/108 250/351 |
| 8,928,865 B2 * | 1/2015 | Rakuljic ............... | G01S 17/325 356/3.01 |

* cited by examiner

*Primary Examiner* — Luke Ratcliffe
(74) *Attorney, Agent, or Firm* — Wiiliam A Blake

(57) ABSTRACT

A detection apparatus and method for FMCW LIDAR employ signals that are modified so that low-cost and low-speed photodetector arrays, such as CCD or CMOS cameras, can be employed for range detection. The LIDAR is designed to measure the range to one or more targets and includes a single mode swept frequency laser (SFL), whose optical frequency is varied with time, as a result of which, a target beam which is reflected back by the one or more targets is shifted in frequency from a reference beam by an amount that is proportional to the relative range to the one or more targets. The reflected target beam(s) is/are combined with the reference beam and detected by the photodetector array. In the case of a sparse number of targets to be detected, Compressive Sensing (CS) techniques can be employed by a processor to reduce the number of measurements necessary to determine the range of each target.

16 Claims, 3 Drawing Sheets

THREE-DIMENSIONAL TOMOGRAPHIC IMAGING CAMERA BASED ON COMPRESSIVE SENSING

CROSS REFERENCE TO RELATED APPLICATIONS

This application claims the benefit under 35 USC 119(e), of U.S. Provisional Application No. 61/711,417, filed Oct. 9, 2012, which is hereby incorporated by reference in its entirety. This application also contains subject matter that is related to the subject matter disclosed in U.S. application Ser. No. 13/566,962, filed Aug. 3, 2012, which is also incorporated by reference in its entirety (hereinafter the '962 application).

BACKGROUND OF THE INVENTION

1. Field of the Invention

The present invention relates in general to a full-field three-dimensional imaging apparatus and method using a compressive sensing (CS) based tomographic imaging camera (TomICam) in conjunction with a swept-frequency laser source and readily available low-speed detector arrays such as CCD or CMOS cameras. Compressive sensing is employed for the 3-D imaging of targets that are known to comprise a small number of scatterers in the axial (z) direction, i.e., sparse axial scatterers. The CS-TomICam can drastically reduce the number of measurements necessary to generate a full 3-D image, leading to additional advantages such as lower power requirements and image acquisition speeds.

2. Description of the Background Art

Frequency modulated continuous wave (FMCW) reflectometry has emerged as a very important technique in a variety of applications including LIDAR [1], biomedical imaging [2, 3], biometrics [4], and non-contact profilometry [5]. This is due to unique advantages of the FMCW approach such as a high dynamic range and simple data acquisition that does not require high-speed electronics [6]. The basic principle of FMCW LIDAR is as follows. The optical frequency of a single mode laser is varied linearly with time, with a slope $\xi$. The output of the laser impinges on a target and the reflected signal is mixed with a part of the laser output in a photodetector (PD). If the relative delay between the two light paths is $\tau$, the PD output is a sinusoidal current with frequency $\xi\tau$. The distance to the target (or "range") $\tau$ is determined by taking a Fourier transform of the detected photocurrent. Reflections from multiple targets at different depths result in separate frequencies in the photocurrent.

The important metrics of an FMCW system are the linearity of the swept source—a highly linear source eliminates the need for post-processing of acquired data—and the total chirp bandwidth B which determines the range resolution. A high-resolution FMCW LIDAR or imaging system has two important components: i) a broadband swept-frequency laser (SFL) for high axial resolution; and ii) a technique to translate the one-pixel measurement laterally in two dimensions to obtain a full 3-D image.

State of the art SFL sources for biomedical and other imaging applications are typically mechanically tuned external cavity lasers where a rotating grating tunes the lasing frequency [2, 7, 8]. Fourier-domain mode locking [9] and quasi-phase continuous tuning [10] have been developed to further improve the tuning speed and lasing properties of these sources. However, all these approaches suffer from complex mechanical embodiments that limit their speed, linearity, coherence, size, reliability and ease of use and manufacture.

Detectors for 3-D imaging typically rely on the scanning of a single pixel measurement across the target to be imaged [11]. This approach requires a complex system of mechanical scanning elements to precisely move the optical beam from pixel to pixel, which severely limits the speed of image acquisition. It is therefore desirable to eliminate the requirement for mechanical scanning, and obtain the information from the entire field of pixels in one shot. To extend the FMCW technique to a detector array, the frequencies of the photocurrents from each detector in the array should be separately calculated. However, in a high-axial-resolution system, each detector in the array measures a beat signal typically in the MHz regime. A large array of high speed detectors therefore needs to operate at impractical data rates (~THz) and is prohibitively expensive. For this reason, there are no practical full-field FMCW LIDAR imaging systems, except some demonstrations with extremely slow scanning rates [4, 11] or expensive small arrays [12].

An ideal FMCW LIDAR system will therefore consist of a broadband rapidly tuned SFL, and a detection technique that is capable of measuring the lateral extent of the object in one shot. The system will be inexpensive, robust, and contain no moving parts.

Previously, a novel optoelectronic SFL source has been developed [13] based on the tuning of the frequency of a semiconductor laser via its injection current. Using a combination of open loop predistortion and closed loop feedback control of the laser current, the SFL generates extremely linear and broadband optical chirps. The starting frequency and slope of the optical chirp are locked to, and determined solely by, an electronic reference oscillator—they are independent of the tuning characteristics of the laser. Chirp bandwidths of 1 THz at chirp speeds exceeding $10^{16}$ Hz/s have been demonstrated, and it has been shown that arbitrary optical chirp shapes can be electronically generated. The optoelectronic SFL source is compact and robust, has low phase noise and large chirp bandwidth, and has no moving parts.

The invention disclosed in the '962 application provides a detection approach for FMCW LIDAR, in which the frequencies of the signals employed by the apparatus are modified in such a manner that low-cost and low-speed photodetector arrays, such as CCD or CMOS cameras, can be employed in a tomographic imaging camera (TomICam). The approach obviates the need for high-speed detector arrays for full-field imaging, and thus leads to a practical approach to measure FMCW LIDAR signals on an array of pixels in parallel.

In the operation of the TomICam, by first modulating or translating the frequency of at least one of the target or reference beams, the difference between the frequencies of the reflected and reference beams is reduced to a level that is within the bandwidth of the detector array. Thus, the need for high-speed detector arrays for full-field imaging is obviated. The key insight is thus that the measurement of the photocurrent frequency, which determines the distance to the illuminated object or target imaged by a detector array pixel, can be moved to a lower frequency by modulating the optical frequency of at least one arm of the interferometer (e.g., the reference arm or the "Local Oscillator" (LO) arm) using an optical frequency shifter, for example. By using a low-speed photodetector, which effectively acts as a low pass DC filter, all components other than the DC term are filtered out, leaving only the detected value which is proportional to the square root of the reflectivity of the target at the selected range.

Thus, a single pixel measurement using the TomICam yields the value of any target reflections present at a particular distance. The array of low-speed photodetectors can therefore be used to image a lateral two-dimensional "tomographic slice." In the case of a frequency shifter, by electronically varying the value of the frequency shift, tomographic slices at different depths can be obtained and combined to form a full three-dimensional image. Thus N measurements are necessary to measure N possible target depths, where N is determined from the resolution and swept frequency bandwidth of the SFL.

This highlights one potential tradeoff to using the TomICam approach, which is that regardless of the number of targets to be detected, N measurements must still be made to obtain a full 3-D image. In the case of a small number of targets, which is many times the case in typical FMCW LIDAR applications, this process becomes inefficient.

SUMMARY OF THE INVENTION

The present invention provides a new improved version of the TomICam disclosed in the '962 application that employs a modified measurement technique that facilitates the application of Compressive Sensing (also known as Compressive Sampling) (CS) techniques to reduce the number of measurements needed to provide a full 3-D image when the number of targets to be detected is sparse or small.

CS is a well-known but fairly recently developed theory by which a signal that is sparse in one measurement basis, can be recovered in the most efficient way possible with a minimum of measurements in an incoherent projecting basis in which the signal is not sparse. The inventors have recognized that in the TomICam, modulating the optical wave by a sinusoid is a way of projecting the unknown optical signal onto some basis. More specifically, the unknown range of a target in the TomICam, is determined from the frequency value of a sinusoidal waveform. With this knowledge, the inventors then recognized that if the unknown optical signal can instead be projected on to a completely different basis that is incoherent with respect to the original basis, a substantially reduced number of measurements can be made in this different basis to recover the range values of a set of sparse targets using the CS principles.

The projection on to other bases is preferably implemented using the original TomICam architecture, which naturally lends itself to CS without any hardware modifications. In particular, for typical LIDAR targets where the number of axial scatterers is very small (typically 1-2), the imaging efficiency can be further improved using CS, where the targets are imaged using a carefully chosen set of measurement waveforms. The compressive sensing TomICam (CS-TomICam) thus has the potential to reduce the image acquisition time and the optical energy requirement by orders of magnitude.

The present invention is applicable to imaging of targets that are k-sparse (i.e. at most k scatterers) in the axial direction. The basic principle of CS is that information about a k-sparse signal can be recovered from m measurements, where k<m<<N, if the measurements are performed in a basis that is incoherent to the sparse target basis. In the TomICam, this corresponds to measurements performed by modulating the LO arm with appropriately chosen waveforms that replace the single-frequency ($\omega_z$) modulation of the TomICam disclosed in the '962 application. These measurements effectively obtain information over a range of axial depths at once, leading to a smaller number of measurements. An example of such a waveform is a random amplitude modulation waveform, though other non-sinusoidal waveforms can be used.

A variety of measurement matrices W can therefore be programmed electronically in a straightforward manner. Each TomICam measurement $y_s$ is obtained by multiplying the optical beat signal with a unique modulation waveform $W_{sh}$ and integrating over the measurement interval. If the modulation waveforms are chosen appropriately, the measurement matrix can be made to satisfy the crucial requirements for CS, i.e., the restricted isometry property or incoherence. This ensures that range and reflectivity information about the target, which is sparse in the axial direction, is "spread out" in the domain in which the measurement is performed, and a much smaller number of measurements is therefore sufficient to recover the complete image. In the specific case of using an SFL to generate single frequency sinusoids, non-sinusoidal waveforms can be used to modulate the signals in the target and/or reference arm to generate measurements which provide the required incoherence.

BRIEF DESCRIPTION OF THE DRAWINGS

The features and advantages of the present invention will become apparent from the following detailed description of a number of preferred embodiments thereof, taken in conjunction with the accompanying drawings, which are briefly described as follows.

FIG. 1A is a schematic diagram of a prior art FMCW LIDAR that forms the basis for the improved FMCW LIDAR of the present invention. FIG. 1B is a graph showing the frequency of the launched (reference) and reflected beams as a function of time. FIG. 1C is a schematic illustration showing the interaction of the launched and reflected beams when they are received by the photodetector of the LIDAR.

FIG. 2A is a graph showing the frequency of the launched (reference) beam and the frequency of the reflected beam as a function of time. FIG. 2B is a schematic illustration showing the interaction of the launched and reflected beams when they are received by the photodetector of the LIDAR. The double graph of FIG. 2C shows how the Fourier transform of the selected target reflection is shifted to within the bandwidth of the TomICam measurement by an optical frequency shifter.

DETAILED DESCRIPTION OF THE PREFERRED EMBODIMENTS

Figure 1A:
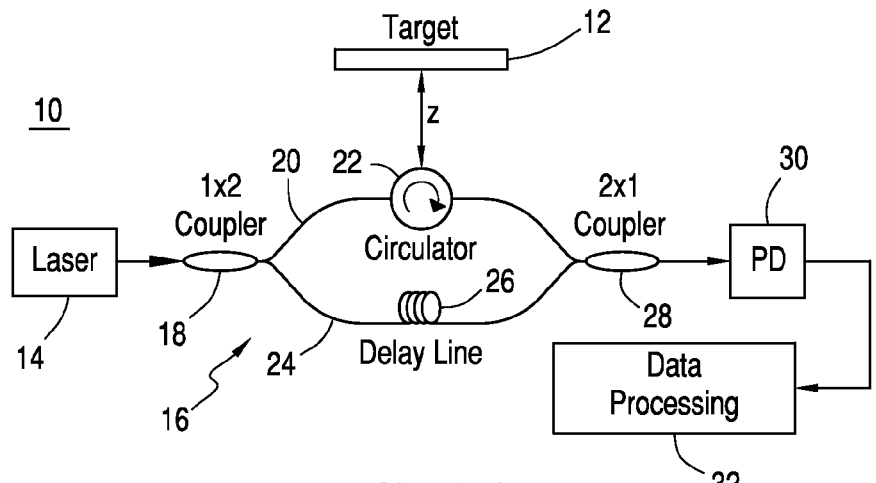
FIGS. 1A-1C illustrate the known principles of FMCW LIDAR using a linearly chirped laser source.

With reference now to a more detailed discussion of the preferred embodiments of the present invention, FIG. 1A illustrates a conventional prior art FMCW LIDAR 10 of the type with which the concepts of the present invention are preferably employed. The LIDAR 10 is designed to measure the distance or range z to a target 12 and includes a single mode swept frequency laser (SFL) 14 which generates a laser beam that is directed as a launched beam through an interferometer 16. The interferometer 16 includes a 1×2 coupler 18 that splits the launched laser beam through a first, target arm 20 and a circulator 22 to the target 12, and through second, reference arm 24 and a delay line 26. During this process, the optical frequency of the SFL 14 is varied linearly with time, with a slope $\xi$.

Figure 1B:
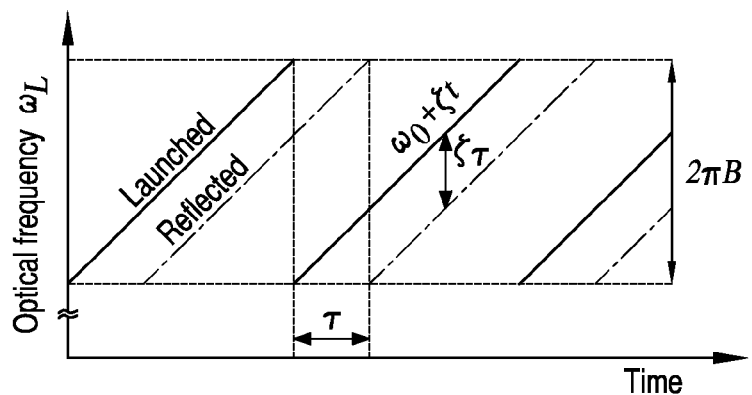
Figure 1C:
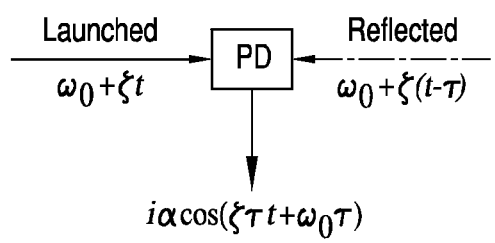

As a result and as illustrated in FIG. 1B, the beam which is reflected by the target 12 is shifted in frequency from the reference arm beam by an amount that is proportional to the range or distance z to the target 12. The frequency shifted reflected target beam is combined with the reference beam by a 2×1 coupler 28 and the two combined beams are received as input to a photodetector (PD) 30. If the relative delay between the target beam path and the reference beam path is $\tau$, the PD output is a sinusoidal current with frequency $\xi\tau$, as shown in FIG. 1C. The distance to the target (or "range") $\tau$ is determined by taking a Fourier transform of the detected photocurrent. Reflections from multiple targets at different depths result in separate frequencies in the photocurrent. These calculations are carried out by a data processing unit 32.

Figure 2A:
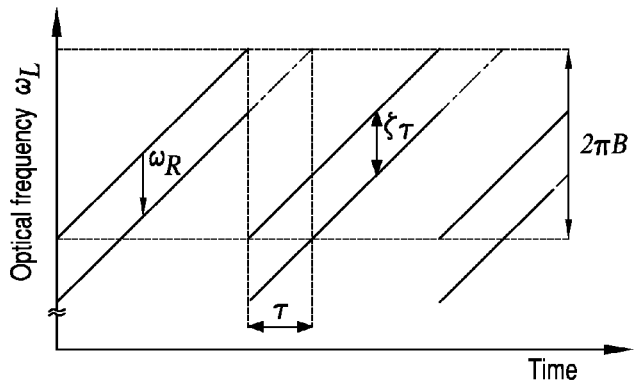
FIGS. 2A-2C graphically Illustrate the concepts of the TomICam for a single pixel of a two-dimensional photodetector array.
Figure 2B:
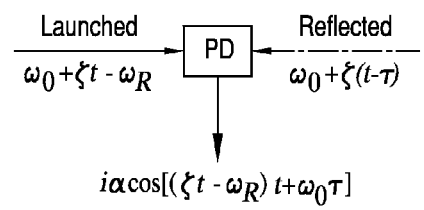
Figure 2C:
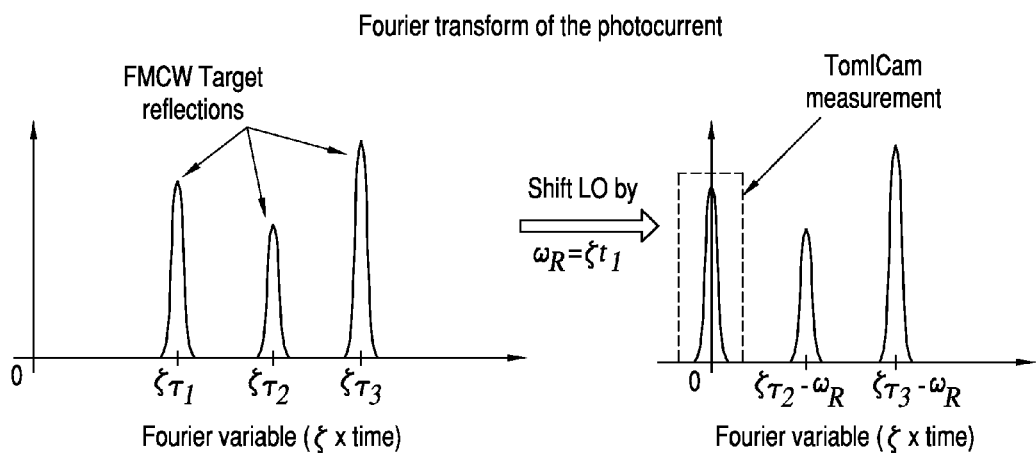

FIGS. 2A-2C graphically illustrate the basic TomICam detection approach for FMCW LIDAR that is disclosed in the '962 application and forms the basis of the present invention, which is also based on low-cost and low-speed two-dimensional photodetector arrays such as CCD or CMOS cameras. The approach obviates the need for high-speed detector arrays for full-field imaging, and thus leads to a practical approach to measuring FMCW LIDAR signals on an array of pixels in parallel.

Let the laser frequency be given by $$\omega_L(t)=\omega_0+\xi t,\ t\in[0,T]. \quad (1)$$

The key insight of the TomICam is that the measurement of the photocurrent frequency, $\xi\tau$ in FIG. 2B, which determines the distance to the illuminated object pixel, can be moved to a lower frequency by shifting the frequency of at least one arm (e.g. the reference arm or the "Local Oscillator" (LO) arm) of the optical chirp by a known frequency $\omega_z$ using an optical frequency shifter, for example. The use of a frequency shifter is a simple, intuitively understandable implementation of the concept. However, any modulator that generates a frequency sideband, such as an optical phase or amplitude modulator may be used instead.

The beat signal from the photodetector over one chirp period is then of the form:

$$i_{beat} = W \sum_{i=1}^{k} \sqrt{R_i}\cos[(\xi\tau_i - \omega_Z)t + \omega_0\tau_i - \phi_Z], \quad (2)$$

where the sum is carried out over k targets at depth $\tau_i$ with reflectivities $R_i$, and W is the launched optical power. In the simplest implementation, a balanced detection scheme is typically necessary to separate the desired beat signal from the self-beating (intensity) terms in the photocurrent. Other implementations are possible, e.g., based on electronic phase reversal, but need not be discussed here.

For convenience, all constants are set to unity. A low-speed detector is employed, which integrates the photocurrent over the chirp duration to yield $$y = \int_0^T \sum_{i=1}^{k} \frac{W\sqrt{R_i}}{T}\cos[(\xi\tau_i - \omega_Z)t + \omega_0\tau_i - \phi_Z]dt, \quad (3)$$

$$= \sum_{i=1}^{k} W\sqrt{R_i}\ \mathrm{sinc}\left(\frac{(\xi\tau_i - \omega_Z)T}{2}\right)\cos\left(\frac{(\xi\tau_i - \omega_Z)T}{2} + \omega_0\tau_i - \phi_Z\right).$$

The sinc function in the summation ensures that all terms other than the target at $\tau_i$ which satisfies $$\tau_i = \omega_Z/\xi \quad (4)$$

are rejected by the measurement, and the detected value is proportional to the square root of the reflectivity of the target at $\tau_i$. This is depicted schematically in FIG. 2C. For brevity, we ignore the cosine phase term in Eq. (3) in this discussion and note that one way to eliminate the phase term is by performing in-phase and quadrature (I/Q) measurements by varying the phase $\phi_z$ of the frequency shifter.

Figure 3:
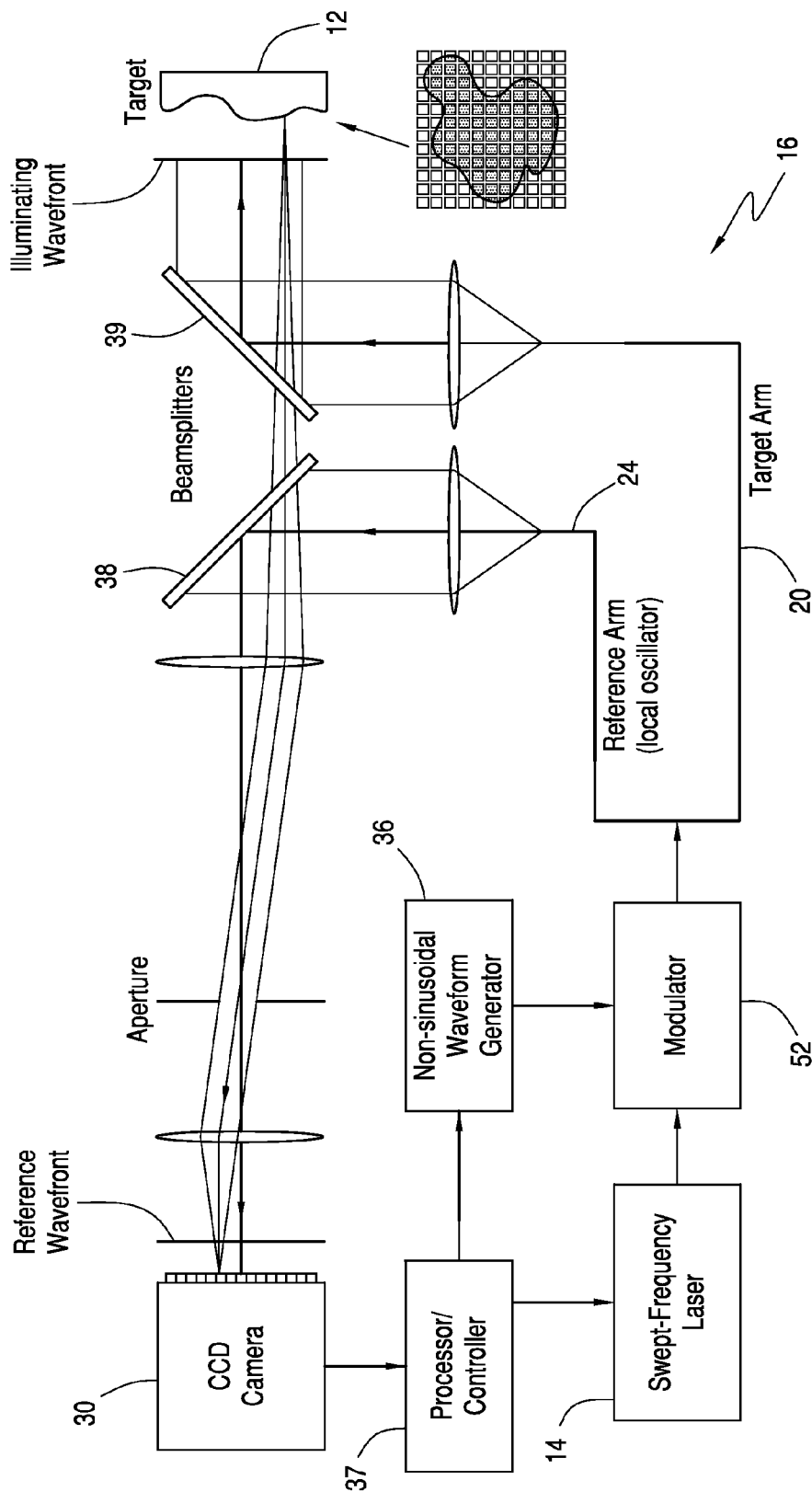
FIG. 3 is a schematic illustration of an implementation of a TomICam three-dimensional imaging system in accordance with a preferred embodiment of the present invention that employs Compressive Sensing (CS) to reduce the number of measurements necessary to obtain a full 3-dimensional image when the number of targets to be detected is sparse.

Whereas the shifting of the optical frequency of the chirped wave using an optical frequency shifter is useful to gain an intuitive understanding of the TomICam concept, a more useful implementation is based on the use of an intensity modulator before splitting the laser output, as shown in FIG. 3 and discussed in greater detail later. Suppose the intensity modulator is driven by a sinusoidal waveform to yield $$W(t)=W_0\cos(\omega_Z t+\phi_Z). \quad (5)$$

When this optical wave passes through the imaging interferometer, the resulting measurement is:

$$y = \int_0^T \sum_{i=1}^{k} \frac{\sqrt{R_i}}{T} W_0\cos[(\omega_Z t + \phi_Z)\xi\tau_i t + \omega_0\tau_i)]dt, \quad (6)$$

$$= \int_0^T \sum_{i=1}^{k} \frac{\sqrt{R_i}}{2T} W_0\{\cos[(\omega_Z - \xi\tau_i)t + \phi_Z - \omega_0\tau_i] +$$

$$\cos[(\omega_Z - \xi\tau_i)t + \phi_Z + \omega_0\tau_i]\}dt.$$

The second term in the integral is rapidly oscillating and vanishes, leaving us with an expression identical in form to Eq. (3). In other words, intensity modulation of the chirped laser output at $\omega_z$ performs the same function as an optical frequency shift by $\omega_z$. The use of the intensity modulator also makes the TomICam a versatile tool for compressive sensing, as discussed later.

As described above, a single pixel Tomographic imaging camera measurement yields the value of any target reflections present at a particular distance $\tau_{i0}$, (we will refer to a distance $c\tau_{i0}$ as $\tau_{i0}$.) using a low-speed photodetector. An array of low-speed photodetectors, such as a CCD or a CMOS camera, can therefore be used to image a lateral two-dimensional "tomographic slice." By electronically varying the value of the frequency shift $\omega_z$, tomographic slices at different axial depths (ranges) can be obtained and combined to form a full three-dimensional image.

With specific reference now to FIG. 3, a modification of the FMCW LIDAR 10 of FIG. 1A is illustrated which is specifically designed to implement the TomICam concepts disclosed in the '962 application in combination with CS. This embodiment is useful in situations where the total number of targets k, whose ranges and reflectivities are to be determined, is sparse relative to the total number of slices N that are required to provide a full three-dimensional image using the TomICam approach. In this embodiment, a modulator 34 is disposed between the SFL 14 and the target arm 20 and reference arm 24 (also referred to as the local oscillator or LO arm) of the interferometer 16. The modulator 34 modulates the target and reference beams in accordance with an input from a non-sinusoidal waveform generator 36. In this embodiment, where both arms 20 and 24 of the interferometer 16 are modulated, the modulator 34 is an intensity modulator and operates as discussed above in conjunction with Equations (5) and (6). However, it should be understood that other, single arm modulation embodiments, such as those disclosed in the '962 application, can also be used to implement the present invention. In such single arm modulation embodiments, the modulator could be anyone of an intensity modulator, an amplitude modulator, a frequency modulator, a phase modulator and a frequency shifter.

The non-sinusoidal waveform generator 36 is a key element of the present invention and enables, through the modulator 34, modulation of the beam from the SFL 14 with a sequence of non-sinusoidal waveforms. Being non-sinusoidal, the waveforms are not of the same basis or domain as that of the interferometric beat signal of a combined output beam that is formed when the one or more beams reflect off of one or more corresponding targets and are recombined with the reference beam. This is in contrast to the use of a frequency shifter as in the conventional TomI-Cam disclosed in the '962 application, for example, that enables successive detection of targets at each of the N frequency dependent slices along the axial depth direction that result in the combined output beam being sinusoidal. By using a number m of different non-sinusoidal waveforms to control the modulator 34 sequentially, a sequence of measurements can be made, each of which includes range and reflectivity information pertaining to all k of the targets to be detected. In other words, the target distribution in the non-sinusoidal waveform basis is not sparse. In addition, each of the measurements inherently also includes information pertaining to each of the N-k frequency dependent depth slices that contain no targets and thus have zero reflectivity values.

A processor/controller 37 is provided which makes the necessary target range and reflectivity determination calculations using known CS minimization techniques based on the outputs of the CCD Camera 30 that is employed as the photodetector is this particular embodiment. (The CS techniques are discussed in greater detail following the discussion of the elements of FIG. 3). In addition, the processor/controller 37 controls the chirping operation of the SFL 14 and operation of the modulator 34 by sequentially applying the sequence of different non-sinusoidal waveforms thereto using the non-sinusoidal waveform generator 36. The beams in the target and reference arms 20 and 24 are directed through first and second beamsplitters 38 and 39 that also form part of the interferometer 16. The target beam is directed to the target(s) 12 and the reference beam is directed to the CCD camera 30. The reflected beam from the target(s) 12 is also directed through beamsplitters 38 and 39 to the CCD camera 30. The beamsplitters 38 and 39 thus act to combine the reference beam and the reflected beam(s) from the target(s) 12 into a combined output beam that is input or incident on the CCD camera 30.

It should be noted that it is not necessary that the illuminating wavefront be parallel to the optical axis as depicted in FIG. 3 since most targets typically exhibit Lambertian reflectance. This can eliminate the need for the second beamsplitter 39 shown on the right in FIG. 3, leading to higher received signal powers.

In operation, the processor/controller 37 initiates the measurement process by triggering the chirping of the SFL 14 and at the same time, enabling the waveform generator 36 to apply the first of a sequence of non-sinusoidal waveforms to the modulator 34. The now modulated frequency chirped beam from the SFL 14 is then split and directed to the one or more targets 12, which cause formation of one or more reflected beams. These one or more reflected beams are then recombined by the beamsplitters 38 and 39 into the combined output beam, which, by virtue of the non-sinusoidal modulation, now contains not only information pertaining to the ranges and reflectivities of each of the k sparse targets, but also information pertaining to each of the N-k range depths than contain no targets. In other words, the combined output beam contains information for all N axial depths that can be measured by the FMCW LIDAR 10.

This combined output beam then is input to, or incident on, the CCD camera 30, which effectively acts as a low pass filter and generates, for each pixel, an output current whose value represents a combination of the information for each of the N range or depth slices. The output current measurement from each pixel of the CCD camera 30 is then fed into the processor/controller 37 which stores the measurement and then starts the measurement process over again with a second non-sinusoidal waveform from the sequence of non-sinusoidal waveforms to be applied by the waveform generator 36. This process is repeated until a total of m measurements are stored in the processor/controller 37, one for each of the m non-sinusoidal waveforms as applied to the modulator 34. The processor/controller 37 can then determine the range and reflectivity for each of the k sparse targets using the CS techniques, which are discussed in greater detail next.

Compressive Sensing (CS) Background

Compressive sensing, also known as compressive sampling or compressed sensing, is a well-known theory that facilitates the recovery of a sparse number of signals from a number of measurements that is substantially less than the total number of measurements that are available. The salient features of compressive sensing are briefly discussed here, in order to provide an implementation of TomICam that takes advantage of its benefits. Consider a linear measurement system $$y=Ax, \ A\in \mathcal{E}^{m\times N}, \ x\in \mathcal{E}^{N}, \ y\in \mathcal{E}^{m} \tag{7}$$

The vector x is the signal of interest, and the vector y represents the collected measurements. The two are related by the measurement matrix A. The case of interest is the highly underdetermined case, m<<N, where m is the number of measurements to be made and N is the total number of measurements available to be made. The system therefore possesses infinitely many solutions. Nevertheless, compressive sensing provides a framework to uniquely recover x, given that x is sufficiently sparse, and the measurement matrix A satisfies certain properties such as the restricted isometry property or incoherence [14]. The intuition behind CS is to perform the measurements in a carefully chosen basis where the representation of the signal x is not sparse, even though x itself is sparse. The signal is then recovered by finding the sparsest x that is consistent with the measurement in Eq. (7). In particular, the recovery is accomplished by solving a complex minimization problem:

$$\min \|z\|_1 \ \text{s.t.} \ Az=y, \tag{8}$$

where $\|*\|_1$ is the $l_1$ norm. The success of recovery depends on the number of measurements, m, the sparsity level of x, and the measurement matrix A.

The TomICam CS Problem

Fundamentally, the FMCW LIDAR technique converts the reflection from a given depth in the z direction to a sinusoidal variation of the detected photocurrent at a particular frequency, and targets or scatterers at different depths result in a photocurrent with multiple frequency components. As already discussed, the TomICam disclosed in the '962 application uses a single frequency modulation of the interferometer reference (LO) arm to determine one of these possible frequency components. Full image acquisition requires N measurements, determined by the axial resolution of the swept-frequency source. When the number of axial targets, and hence the number of frequency components of the FMCW photocurrent, is sparse, the CS framework thus enables image acquisition with a smaller number of measurements. In order to accomplish this, the TomICam technique must be modified so that the measurements are performed in the appropriately chosen basis; one that is incoherent to the basis of single frequency sinusoids in the PD photocurrent.

The TomICam is inherently suited to CS imaging, in that different types of measurements may be easily performed with almost no modification to the system. Thus, the TomICam image acquisition equation (6) can be recast in a form suitable for the discussion of compressive sensing. Assume that there are N possible, i.e., allowed by the resolution limit, target locations, $\tau_i$, i=0, 1, K, (N−1) with target reflectivities $R_i$. We assume that the target is k-sparse, so that only k of the N reflectivities are non-zero. The spatial resolution of the SFL of Eq. (1) is $\Delta\tau=2\pi/\xi T$, and we therefore choose $\tau_i=(2\pi/\xi T)i$. Similarly, the time axis is discretized to N points with $t_h=hT/N$, with h=0, 1, K (N−1). The first of Eqs. (6) can now be written as $$y = \sum_{h=0}^{N-1} \sum_{i=0}^{N-1} W(t_h) \cdot \frac{\sqrt{R_i}}{N} \cos(\xi \tau_i t_h + \omega_0 \tau_i). \qquad (9)$$

Each TomICam measurement therefore yields a single value y (per pixel in the lateral plane), as given by Eq. (9). Note that a sinusoidal variation of $W(t_h)$ yields the reflectivity at a particular axial depth, and a tomographic slice is obtained using a detector array, as discussed previously. However, there are other intensity modulation waveforms $W(t_h)$ that can be used for compressive sensing of the axial target information. We extend the discussion to include m measurements indexed by s, i.e., we use m different intensity modulation waveforms $W_s(t_h)$ to obtain m distinct measurements $y_s$. Eq. (9) can be simplified to give $$y_s = \text{Re} \sum_{h=0}^{N-1} \sum_{i=0}^{N-1} W_s\left(\frac{hT}{N}\right) \cdot \frac{1}{\sqrt{N}} \exp\left(-j\frac{2\pi hi}{N}\right) \cdot \sqrt{\frac{R_i}{N}} \exp\left(-j\frac{2\pi \omega_0}{\xi T}\right), \qquad (1)$$

$$= \text{Re} \sum_{h=0}^{N-1} \sum_{i=0}^{N-1} W_{sh} \cdot F_{hi} \cdot x_i,$$

where $W_{sh}$ are the intensity modulation waveforms, s=0, 1, K, (N−1). In matrix notation, therefore, $$y = WFx \qquad (2)$$

where it is understood that the measurements correspond to the real part of the right hand side. The variable x is the k-sparse target vector of length N, y is the vector containing the m TomICam measurements, F is the N×N unitary Fourier matrix, and the m×N matrix W denotes the m intensity modulation waveforms used in the measurements.

A variety of measurement matrices W can therefore be programmed electronically in a straightforward manner. Each TomICam measurement $y_s$ is obtained by multiplying the optical beat signal with a unique modulation waveform $W_{sh}$ and integrating over the measurement interval. If the modulation waveforms are chosen appropriately, the measurement matrix can be made to satisfy the crucial requirements for CS, i.e., the restricted isometry property or incoherence [14]. This ensures that information about the target, which is sparse in the axial direction, is "spread out" in the domain in which the measurement is performed, and a much smaller number of measurements is therefore sufficient to recover the complete image.

Robust Recovery

We now consider the question of the design of the measurement waveforms W (yielding the measurement matrix A=WF) that enable robust recovery of sparse targets. The design is motivated by the need to determine a sparse set of photocurrent frequencies, which means that the waveform modulating the LO or target arm should contain all possible frequency components. The frequency referred to here is the Fourier frequency (or frequency components) of the photocurrent in an FMCW experiment (typical range 0-10 MHz). This should not be confused with the optical frequency (at 200 THz). In fact, since the linear chirp of the source maps optical frequency on to time, the optical frequency and the photocurrent frequency are conjugate Fourier variables.

We consider two examples for W that are known to satisfy the restricted isometry property, and hence allow for robust signal recovery. The waveforms considered in these examples rely on the use of a superposition of frequency components with random (complex) weights, and represent straightforward implementations of CS-TomICam imaging. In addition, we propose to investigate other measurement matrices which may be more practical, optimal, or more conveniently realized in an experimental setting.

Random Partial Fourier Measurement Matrix

A random partial Fourier matrix of size m×N is generated by selecting m rows at random from the N×N Fourier matrix F. This operation is accomplished by a binary matrix (which has entries 0 or 1) W that has a single non-zero entry in each row. The location of the non-zero entry is chosen randomly without replacement. For this class of matrices, robust signal recovery is guaranteed whenever the number of measurements satisfies [15]

$$m \geq Ck \log(N/\epsilon) \qquad (12)$$

where k is the signal sparsity, 1−ϵ is the probability of recovery, and C is a constant of order unity.

In the TomICam implementation, a random partial Fourier measurement corresponds to pulsing the intensity modulator during the linear chirp, so that only a single optical frequency, chosen at random, is delivered to the target per scan.

Gaussian or Sub-Gaussian Random Measurement Matrix

Measurement matrices with entries that are independently and identically distributed Gaussian variables may also be used for compressive sensing [16]. In this case, robust signal recovery is guaranteed for $$m \geq Ck \log(N/k) \qquad (13)$$

The same result also applies to a measurement matrix that is a product of a Gaussian random matrix and a unitary matrix [15]. Since F is unitary, a Gaussian random matrix W will result in robust signal recovery when Eq. (13) is satisfied. The random Gaussian matrix consists of measurements where the LO arm is modulated with a waveform whose amplitude at any time is determined by a Gaussian probability distribution. It can also be interpreted as a collection of TomICam measurements, where each measurement queries all possible depths, with different weights.

We want the failure rate of the reconstruction, $\epsilon$, to be much less than unity, while the sparsity level k is at least unity. Therefore, the random partial Fourier matrix requires more measurements than the Gaussian random matrix for correct recovery. However, the latter may be computed in a more efficient manner using FFT algorithms.

Numerous other waveforms can be employed to modulate the TomICam signals and facilitate the use of CS to obtain the range information for a sparse number of targets. The main requirement is that the waveforms be non-sinusoidal so that they are incoherent with respect to the sinusoidal signals normally induced by the SFL when no modulator is present. Examples of such non-sinusoidal waveforms include: waveforms that vary randomly between 0 and 1 as a function of time (a binary waveform); a delta function in time, where the location of the delta function is deterministic or random; and a waveform that consists of several delta functions in time, whose locations are possibly random. When the requisite number m of these waveforms are put together into a matrix, the matrix will satisfy the restricted isometry property or incoherence. As a result, robust recovery of the range info for the spare targets is possible.

In summary, the present invention comprises a modification of the TomICam concepts disclosed in the '962 application which results in far fewer measurements being required to determine the range and reflectivities of one or more targets, when the number of targets k to be detected is known to be sparse relative to the total number N of possible range measurements. In that case, a small number m of non-sinusoidal waveforms can provide enough information to recover each of the k sparse targets using known CS techniques, when k<m<<N. This is based on the recognition that modulating the optical wave by a sinusoid in the original TomICam is a way of projecting the unknown optical signal on to some basis. Then, by projecting this unknown optical signal on to a completely different basis using the TomICam architecture, CS facilitates more efficient range measurement.

Although the invention has been disclosed in terms of a number of preferred embodiments and variations thereon, it will be understood that numerous other variations and modifications could be made thereto without departing from the scope of the invention as set forth in the claims, which follow the listed references.

REFERENCES

[1] A. Dieckmann, "FMCW-LIDAR with tunable twin-guide laser diode," *Electronics Letters*, vol. 30, pp. 308-309, 1994.

[2] S. H. Yun, G. J. Tearney, B. J. Vakoc, M. Shishkov, W. Y. Oh, A. E. Desjardins, M. J. Suter, R. C. Chan, J. A. Evans, I.-K. Jang, N. S. Nishioka, J. F. de Boer, and B. E. Bouma, "Comprehensive volumetric optical microscopy in vivo," *Nat Med*, vol. 12, pp. 1429-1433, 2006.

[3] M. A. Choma, K. Hsu, and J. A. Izatt, "Swept source optical coherence tomography using an all-fiber 1300-nm ring laser source," *Journal of Biomedical Optics*, vol. 10, July-August 2005.

[4] S. K. Dubey, T. Anna, C. Shakher, and D. S. Mehta, "Fingerprint detection using full-field swept-source optical coherence tomography," *Applied Physics Letters*, vol. 91, Oct. 29, 2007.

[5] C. Ndiaye, T. Hara, H. Ito, and Ieee, "Profilometry using a frequency-shifted feedback laser," in 2005 *Conference on Lasers & Electro-Optics*, 2005, pp. 1757-1759.

[6] M. C. Amann, T. Bosch, M. Lescure, R. Myllyla, and M. Rioux, "Laser ranging: a critical review of usual techniques for distance measurement," *Optical Engineering*, vol. 40, pp. 10-19, January 2001.

[7] M. K. K. Leung, A. Mariampillai, B. A. Standish, K. K. C. Lee, N. R. Munce, I. A. Vitkin, and V. X. D. Yang, "High-power wavelength-swept laser in Littman telescope-less polygon filter and dual-amplifier configuration for multichannel optical coherence tomography," *Optics Letters*, vol. 34, pp. 2814-2816, Sep. 15, 2009.

[8] S. H. Yun, C. Boudoux, G. J. Tearney, and B. E. Bouma, "High-speed wavelength-swept semiconductor laser with a polygon-scanner-based wavelength filter," *Optics Letters*, vol. 28, pp. 1981-1983, Oct. 15, 2003.

[9] R. Huber, M. Wojtkowski, and J. G. Fujimoto, "Fourier Domain Mode Locking (FDML): A new laser operating regime and applications for optical coherence tomography," *Optics Express*, vol. 14, pp. 3225-3237, Apr. 17, 2006.

[10] C. Chong, T. Suzuki, A. Morosawa, and T. Sakai, "Spectral narrowing effect by quasi-phase continuous tuning in high-speed wavelength-swept light source," *Optics Express*, vol. 16, pp. 21105-21118, Dec. 8, 2008.

[11] J. C. Marron and K. W. Gleichman, "Three-dimensional imaging using a tunable laser source," *Optical Engineering*, vol. 39, pp. 47-51, January 2000.

[12] M. L. Simpson, C. A. Bennett, M. S. Emery, D. P. Hutchinson, G. H. Miller, R. K. Richards, and D. N. Sitter, "Coherent imaging with two-dimensional focal-plane arrays: design and applications," *Appl. Opt.*, vol. 36, pp. 6913-6920, 1997.

[13] N. Satyan, A. Vasilyev, G. Rakuljic, V. Leyva, and A. Yariv, "Precise control of broadband frequency chirps using optoelectronic feedback," *Optics Express*, vol. 17, pp. 15991-15999, Aug. 31, 2009.

[14] M. A. Davenport and M. F. Duarte, "Introduction to Compressed Sensing," in *Electrical Engineering*, Y. C. Eldar and G. Kutyniok, Eds., ed: Cambridge University Press, 2011, pp. 1-68.

[15] M. Formasier and H. Rauhut, "Compressive Sensing," in *Handbook of Mathematical Methods in Imaging*, O. Scherzer, Ed., ed: Springer, 2011, pp. 187-228.

[16] H. Rauhut, "Compressive sensing and structured random matrices," in *Theoretical Foundations and Numerical Methods for Sparse Recovery*. vol. 9, M. Formasier, Ed., ed: deGruyter, 2010, pp. 1-92.

The invention claimed is:

1. An apparatus for detecting the range of one or more targets comprising:

a swept frequency laser source for generating an output launched laser beam whose frequency varies as a function of time over a predetermined optical bandwidth;

an interferometer for receiving said launched laser beam and dividing said laser beam into a target beam and a reference beam, said interferometer including a first, target arm for directing said target beam to one or more targets whose range is to be determined, receiving a one or more reflected target beams from said one or more targets; a second, reference arm for transmitting said reference beam; and a combiner for combining said reference beam in said reference arm with said one or more reflected target beams in said target arm and forming a combined output beam;

a modulator for modulating at least one of said target beam and said reference beam;

a waveform generator for applying one of a plurality of non-sinusoidal waveforms to said modulator such that said combined output beam contains at least range information for each of said one or more targets;

a photodetector for receiving said combined output beam and generating an output measurement in response thereto; and a processor for controlling operation of said swept frequency laser source and said waveform generator so that a sequence of said non-sinusoidal waveforms is applied to said modulator by said waveform generator and said photodetector generates a sequence of output measurements, each of which corresponds to one of said non-sinusoidal waveforms applied to said modulator; and wherein said processor receives said sequence of output measurements from said photodetector and is programmed to determine the range of said one or more targets by using compressive sensing techniques with said sequence of output measurements.

2. The apparatus of claim 1, wherein said combined output beam further contains reflectivity information for each of said one or more targets and said processor is also programmed to determine the reflectivity of each of said one or more targets using compressive sensing techniques.

3. The apparatus of claim 2, wherein measurements for a total of N axial depths can be made based on a swept frequency bandwidth and resolution of said swept frequency laser, and each of said combined output beams contains information regarding each of said N axial depths.

4. The apparatus of claim 1, wherein said modulator for modulating at least one of said target and said reference beams comprises an intensity modulator which modulates both said target and said reference beams.

5. The apparatus of claim 1, wherein said modulator for modulating at least one of said target and said reference beams is selected from the group comprising an amplitude modulator, an intensity modulator, a frequency modulator and a phase modulator which modulates one of said target and said reference beams.

6. The apparatus of claim 1, wherein said photodetector is a low frequency detector selected from the group including a CCD detector and a CMOS detector.

7. The apparatus of claim 1, wherein the ranges of a total of k targets are to be determined and said processor is programmed to apply a number m of said sequence of non-sinusoidal waveforms to said modulator, where m is proportional to k and k<m.

8. The apparatus of claim 7, wherein the total number of possible range values is N and m is substantially less than N.

9. A method for detecting the range of one or more targets comprising the steps of:

generating an output launched laser beam whose frequency varies as a function of time over a predetermined optical bandwidth;

from said launched laser beam, forming a first target beam and a second, reference beam, at least one of which is modulated with one of a sequence of non-sinusoidal waveforms;

directing said target beam to one or more targets whose ranges are to be determined;

receiving one or more reflections of said target beam that are reflected by said one or more targets;

combining said reference beam with said one or more reflections of said target beam to form a combined output beam, said combined output beam containing at least range information for each of said one or more targets;

optically detecting said combined output beam with a photodetector;

generating a first output measurement from said photodetector that is input to a processor, said output measurement corresponding to said one of said sequence of non-sinusoidal waveforms;

repeating each of the foregoing steps for each of said non-sinusoidal waveforms in said sequence until a sequence of output measurements has been generated by said photodetector and input to said processor; and determining the range to each of said one or more targets with said processor from said sequence output measurements by using compressive sensing.

10. The method of claim 9, wherein said combined output beam further contains reflectivity information for each of said one or more targets and said processor is also programmed to determine the reflectivity of each of said one or more targets using compressive sensing.

11. The method of claim 10, wherein range and reflectivity measurements for a total of N axial depths can be made based on a swept frequency bandwidth and resolution of said swept frequency laser and each of said combined output beams contains information regarding each of said N axial depths.

12. The method of claim 9, wherein said sequence of non-sinusoidal waveforms is applied to an intensity modulator which modulates both said target and said reference beams.

13. The method of claim 9 wherein said sequence of non-sinusoidal waveforms is applied to a modulator selected from the group comprising an intensity modulator, an amplitude modulator, a frequency modulator and a phase modulator which modulates one of said target and said reference beams.

14. The method of claim 9, wherein said photodetector is a low frequency detector selected from the group including a CCD detector and a CMOS detector.

15. The method of claim 9, wherein the ranges of a total of k targets are to be determined and a number m of said non-sinusoidal waveforms is applied to said modulator, where m is proportional to k and k<m.

16. The method of claim 15, wherein the total number of possible range values is N and m is substantially less than N.

* * * * *